(12) United States Patent
Li et al.

(10) Patent No.: US 8,803,835 B2
(45) Date of Patent: Aug. 12, 2014

(54) TOUCH SCREEN DEVICE

(71) Applicant: FocalTech Systems, Ltd., Grand Cayman (KY)

(72) Inventors: Chen Li, Shenzhen (CN); Lianghua Mo, Shenzhen (CN); Jingkai Zhang, Shenzhen (CN); Xinxi Jiang, Shenzhen (CN); Huaiyi Xu, Shenzhen (CN)

(73) Assignee: FocalTech Systems, Ltd., Grand Cayman (KY)

( * ) Notice: Subject to any disclaimer, the term of this patent is extended or adjusted under 35 U.S.C. 154(b) by 129 days.

(21) Appl. No.: 13/684,936

(22) Filed: Nov. 26, 2012

(65) Prior Publication Data

US 2014/0035863 A1 Feb. 6, 2014

(30) Foreign Application Priority Data

Jul. 31, 2012 (CN) .......................... 2012 1 0270389

(51) Int. Cl.
*G06F 3/044* (2006.01)

(52) U.S. Cl.
CPC ...................................... *G06F 3/044* (2013.01)
USPC ...... 345/173; 345/174; 178/18.06; 178/19.03

(58) Field of Classification Search
CPC ....... G06F 3/041; G06F 3/0416; G06F 3/044; G06F 2203/0401; G06F 2203/04108
USPC .................... 345/173–179; 178/18.01–18.11, 178/19.01–19.04
See application file for complete search history.

(56) References Cited

U.S. PATENT DOCUMENTS

| | | | | |
|---|---|---|---|---|
| 5,218,174 A | * | 6/1993 | Gray et al. ................. | 178/19.03 |
| 6,025,726 A | * | 2/2000 | Gershenfeld et al. | |
| 2011/0210939 A1 | * | 9/2011 | Reynolds et al. ............. | 345/174 |
| 2013/0265242 A1 | * | 10/2013 | Richards et al. ............. | 345/173 |

* cited by examiner

*Primary Examiner* — Regina Liang
(74) *Attorney, Agent, or Firm* — Harness, Dickey & Pierce, P.L.C.

(57) ABSTRACT

It is provided a touch screen device applied in an electronic information technology area. In the touch screen device supporting an active capacitance stylus, a demodulation unit demodulates a signal received by a reception unit by two orthogonal signals, and then an amplitude recovery unit recovers an amplitude of the signal received by the reception unit, the amplitude of the signal received by the reception unit can be recovered relatively exactly without the need that the demodulation signal must be synchronous with the signal received by the reception unit (or the signal transmitted from the active capacitance stylus), and there is no need to add additional hardware resources for synchronization in the touch screen device of the embodiment of the present invention compared with the existing detection method which needs to perform synchronization of the demodulation signal and the signal transmitted from the active capacitance stylus in the prior art.

13 Claims, 4 Drawing Sheets

TOUCH SCREEN DEVICE

CROSS-REFERENCE TO RELATED APPLICATIONS

The present application claims priority to Chinese Patent Application No. 201210270389.2, filed on Jul. 31, 2012, and entitled "TOUCH SCREEN DEVICE", the entire disclosure of which is incorporated herein by reference.

FIELD OF THE INVENTION

The present invention relates to the field of electronic information technology, and in particular to a touch screen device.

BACKGROUND OF THE INVENTION

A capacitive touch screen is already widely used in various human-computer interaction devices. Nowadays, some capacitive touch screens can support finger touch and active capacitance stylus touch at the same time, and it requires the touch screen device can detect the contact of the finger and the active capacitance stylus with the touch screen.

In general, a touch screen device includes a touch screen and a touch screen controller, wherein the touch screen controller mainly detects the contact of the finger and the active capacitance stylus with the touch screen by the following structure: a reception unit (represented as RX), a transmission unit (represented as TX) and a signal processing unit, a mutual capacitor is connected between the reception unit and the transmission unit, and the touch screen may be taken as a part of the mutual capacitor. When detecting the contact of the finger with the touch screen, the transmission unit transmits a signal of certain frequency, and when the reception unit receives the signal, the signal processing unit may detect whether the finger contacts the touch screen according to an amplitude of the signal received by the reception unit, the amplitude of the received signal is related with the magnitude of the mutual capacitor, the magnitude of the mutual capacitor is changed when the finger contacts an intersection of RX and TX on the touch screen, i.e., the position of the mutual capacitor, which causes the amplitude of the received signal to be changed, therefore, the contact of the finger with the touch screen can be detected by detecting the amplitude of the received signal. When detecting the contact of the active capacitance stylus with the touch screen, the transmission unit is disabled and the active capacitance stylus is used as a signal transmission end, the signal processing unit detects whether the active capacitance stylus contacts the touch screen by detecting the amplitude of the signal transmitted from the active capacitance stylus and received by the reception unit.

During the above existing process of contact detection, the amplitude of the signal received by the reception unit is recovered after a demodulation process is performed on the signal received by the reception unit, and thereby the signal processing unit can detect the contact of the finger or the active capacitance stylus by determining the amplitude of the signal received by the reception unit. When detecting the active capacitance stylus, the demodulation signal may be asynchronous with the transmission signal since the signal transmission end is out of the touch screen device, which results in that the amplitude recovered after the demodulation process cannot correctly reflect the signal received by the reception unit.

The existing solution is to perform the demodulation after performing a phase synchronization between the demodulation signal and the transmission signal, and a correct phase can be found out by comparing demodulation signals of multiple phases with the transmission signal at the same time when performing the synchronization between the demodulation signal and the transmission signal; however, such way needs large numbers of hardware resources; another synchronization way is to adjust the phase of the demodulation signal step by step in a time-sharing manner, to make the demodulation signal synchronous with the transmission signal, so the hardware consumption can be reduced, but the synchronization time is often long which will affect the detection efficiency of the active capacitance stylus.

SUMMARY OF THE INVENTION

An embodiment of the present invention provides a touch screen device which supports detection of active capacitance stylus, and can exactly demodulate a signal received by a reception unit in a case that the demodulation signal is asynchronous with the transmission signal (or the signal received by the reception unit), thereby the detection efficiency of the active capacitance stylus is improved.

An embodiment of the present invention provides a touch screen device, including a reception unit, a signal processing unit and a mutual capacitor connected with the reception unit, the touch screen device further includes a demodulation unit and an amplitude recovery unit.

The demodulation unit is connected with an output end of the reception unit for demodulating a signal received by the reception unit by each of two orthogonal signals.

An output of the demodulation unit is connected with the amplitude recovery unit, the amplitude recovery unit is used for obtaining low pass portions of each of the two demodulated signals obtained after demodulation by the demodulation unit, determining an amplitude of the signal received by the reception unit according to amplitudes of low pass portions of the two demodulated signals, and transmitting the determined amplitude of the signal to the signal processing unit.

In the touch screen device of the present embodiment, the demodulation unit demodulates the signal received by the reception unit by two orthogonal signals, and then the amplitude recovery unit recovers the amplitude of the signal received by the reception unit, the demodulation signal can relatively exactly recover the amplitude of the signal received by the reception unit even without the need that the demodulation signal must be synchronous with the signal received by the reception unit (or the signal transmitted from the active capacitance stylus), so there is no need to add additional hardware resources for synchronization in the touch screen device of the embodiment of the present invention compared with the existing detection method which needs to perform synchronization of the demodulation signal and the signal transmitted from the active capacitance stylus in the prior art, and the detection efficiency of the active capacitance stylus is greatly improved since the synchronization is not needed.

BRIEF DESCRIPTION OF THE DRAWINGS

In order to explain technical solutions of embodiments of the present invention or the prior art more clearly, a brief introduction of drawings to be used for describing the embodiments or the prior art will be made below. Apparently, the drawings described below are merely some embodiments of the present invention, and other drawings can be obtained according to these drawings by those skilled in the art without creative labor.

DETAILED DESCRIPTION OF THE INVENTION

A clear and full description of technical solutions of embodiments of the present invention is made below in conjunction with drawings of the embodiments of the present invention. Apparently, the described embodiments are merely parts of embodiments and not all of embodiments of the present invention. Based on the embodiments of the present invention, other embodiments obtained by those skilled in the art without creative labor are all belong to the protection scope of the present invention.

Figure 1:
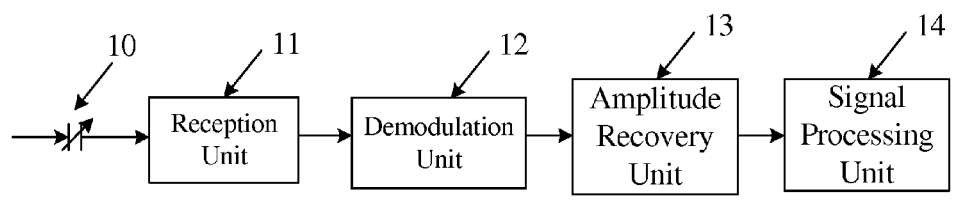
FIG. 1 is a schematic structure diagram of a touch screen device according to an embodiment of the present invention.

An embodiment of the present invention provides a touch screen device, the schematic logic structure diagram thereof is shown in FIG. 1, including a reception unit 11, a signal processing unit 14 and a mutual capacitor 10 connected with the reception unit, wherein the mutual capacitor 10 is an inherent structure of the touch screen in the touch screen device, the touch screen device further includes a demodulation unit 12 and an amplitude recovery unit 13.

The demodulation unit 12 is connected with an output end of the reception unit 11 for demodulating a signal received by the reception unit 11 by each of two orthogonal signals, specifically, demodulation of the signal can be implemented usually by a process which only includes multiplying the original signal by a demodulation signal, however, in the present embodiment, demodulation is performed by taking two orthogonal signals as demodulation signals.

An output end of the demodulation unit 12 is connected with the amplitude recovery unit 13, the amplitude recovery unit 13 is used for obtaining low pass portions of each of the two demodulated signals after demodulation by the demodulation unit 12, determining an amplitude of the signal received by the reception unit 11 according to the amplitudes of the low pass portions of the two demodulated signals, and transmitting the determined amplitude of the signal to the signal processing unit 14.

The amplitude recovery unit 13 may specifically obtain the amplitude of the signal received by the reception unit 11 by adding the squares of the amplitudes of the low pass portions of the two demodulated signals together, when determining the amplitude of the signal received by the reception unit 11.

In the touch screen device of the present embodiment, the demodulation unit 12 demodulates the signal received by the reception unit 11 by two orthogonal signals, and then the amplitude recovery unit 13 recovers the amplitude of the signal received by the reception unit 11, the demodulation signal can be used to relatively exactly recover the amplitude of the signal received by the reception unit without the need that the demodulation signal must be synchronous with the signal received by the reception unit 11 (or the signal transmitted from the active capacitance stylus), so there is no need to add additional hardware resources for synchronization in the touch screen device of the embodiment of the present invention compared with the existing detection method which needs to perform synchronization of the demodulation signal and the signal transmitted from the active capacitance stylus in the prior art, and the detection efficiency of the active capacitance stylus is greatly improved since the synchronization is not needed.

It should be noted that the demodulation unit 12 and the amplitude recovery unit 13 in the touch screen device of the present embodiment may be implemented in multiple ways, for example, by a Central Processing Unit (CPU), a Digital Signal Processing (DSP) or a specific hardware device such as a demodulator.

Touch screen devices of embodiments of the present invention are described by the several specific implements below.

Figure 2:
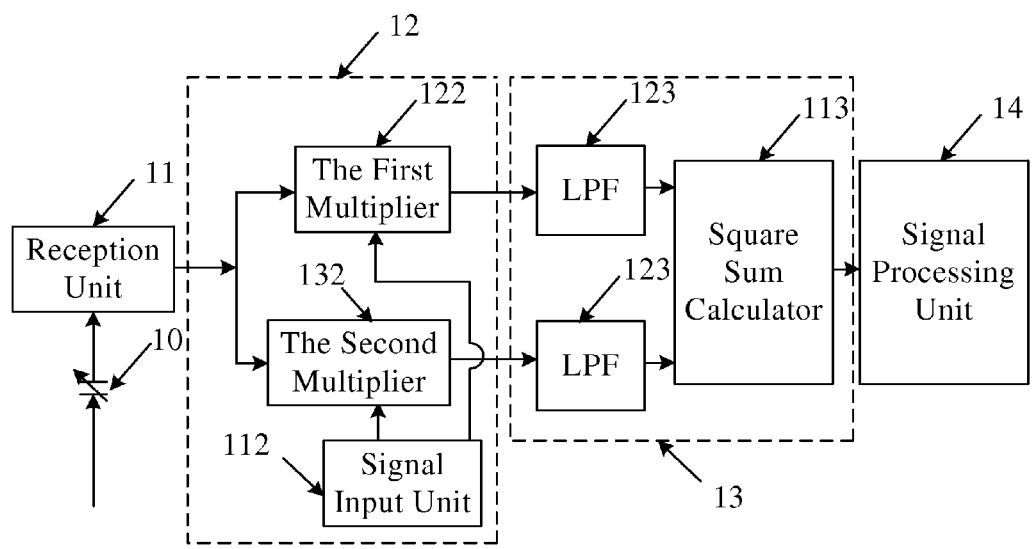
FIG. 2 is a schematic structure diagram of a touch screen device according to a first embodiment of the present invention.

A first embodiment provides a touch screen device, the schematic logic structure diagram thereof is shown in FIG. 2, and connection between two blocks in FIG. 2 does not necessarily represent direct connection between the two blocks, some of them may represent logical connection between the two blocks. The touch screen device includes a reception unit 11, a signal processing unit 14 and a mutual capacitor 10 connected with the reception unit, wherein the mutual capacitor 10 is an inherent structure of the touch screen in the touch screen device, a demodulation unit 12 in the touch screen device specifically includes a signal input unit 112 and two multipliers, i.e., a first multiplier 122 and a second multiplier 132, an amplitude recovery unit 13 in the touch screen device specifically includes a square sum calculator 113 and two low pass filters (LPF) 123.

The signal input unit 112 includes two signal output ends, the two signal output ends are connected with an input end of the first multiplier 122 and an input end of the second multiplier 132 of the two multipliers respectively, for outputting two orthogonal signals to the first multiplier 122 and the second multiplier 132 respectively, such as one sinusoidal signal and one cosine signal which have a same amplitude.

An output end of the reception unit 11 is connected with another input end of the first multiplier 122 and another input end of the second multiplier 132, and the output ends of the first multiplier 122 and the second multiplier 132 are connected (directly or indirectly) with input ends of the two low pass filters respectively.

Output ends of the two low pass filters 123 are connected with two input ends of the square sum calculator 113 respectively, to input the low pass portions of the signals obtained after multiplying operations of the first multiplier 122 and the second multiplier 132 into the square sum calculator 113, an output end of the square sum calculator 113 is connected with the signal processing unit 14.

It can be understood that the active capacitance stylus will transmit an alternating current signal of certain amplitude and certain frequency, such as a sinusoidal wave signal, a square wave signal, a trapezoidal wave signal, or a signal of other waves, the active capacitance stylus is nearest to the reception unit 11 when the active capacitance stylus contacts the position of the mutual capacitor 10 on the touch screen, so the intensity of the signal received by the reception unit 11 will be changed accordingly. It can be seen that, since the active capacitance stylus is far from the reception unit when the active capacitance stylus does not contact the touch screen, the reception unit 11 will not receive a signal or receive a very weak signal; the intensity of the signal received by the reception unit 11 is the biggest when the active capacitance stylus contacts the position of the mutual capacitor 10 on the touch screen; and the intensity of the signal received by the reception unit 11 is relatively weak when the active capacitance stylus contacts other positions on the touch screen. Therefore, the signal processing unit 14 detects the contact of the active capacitance stylus with the touch screen and the contact position by determining the intensity of the signal received by the reception unit 11, specifically, the determination is performed after the amplitude of the signal received by the reception unit 11 is recovered, and in a specific implement, the amplitude is recovered after a demodulation process is performed to the signal received by the reception unit 11.

In the present embodiment, the demodulation process mainly includes performing demodulation to the received signal by two orthogonal demodulation signals, that is, the first multiplier 122 and the second multiplier 132 multiply the signal received by the reception unit 11 by the signal outputted from the signal input signal 112 and output the results to the two low pass filters (LPF) 123, then the signals of low pass portions are inputted into the square sum calculator 113; the square sum calculator 113 adds the squares of the amplitudes of the signals outputted from the first multiplier 122 and the second multiplier 132 together, and thereby the amplitude of the signal received by the reception unit 11 is recovered; the signal processing unit 14 determines whether the active capacitance stylus contacts the touch screen according to magnitude of the amplitude of the signal recovered by the square sum calculator 113 and can determine the contact position on the touch screen by the active capacitance stylus. Wherein the asynchronism between the two orthogonal signals inputted by the signal input unit 112 and the signal transmitted from the active capacitance stylus mainly refers to phase asynchronism, but the orthogonal signals and the transmission signal need to have a same frequency.

It should be noted that the touch screen device of the present embodiment may be a device that merely supports active capacitance stylus detection; or may be a device that supports both active capacitance stylus detection and finger detection, in such case, the touch screen device further includes a transmission unit for transmitting signals, and the mutual capacitor is connected between the transmission unit and the reception unit 11, such touch screen device can detect the contact of the finger and the active capacitance stylus with the touch screen in a time sharing manner, for example, the contact of the finger is detected during a front part of each frame, i.e., enabling the transmission unit to transmit signals, and the contact of the active capacitance stylus is detected during a back part of each frame, i.e., disabling the transmission unit to prevent transmission of signals. Wherein the transmission unit may include multiple transmission ends for transmitting signals, the reception unit 11 may include multiple reception ends for receiving signals, they may work at a same time or in a time sharing manner.

It can be understood that besides the structure shown in FIG. 2, the touch screen device may include other components such as a unit for converting an analog signal received by the reception unit 11 into a digital signal, i.e., analog to digital converter (ADC), the analog to digital converter may be connected between the reception unit 11 and the first multiplier 122 (or the second multiplier 132), that is, a demodulation is performed after an analog to digital conversion on the signal received by the reception unit 11, or the analog to digital converter may be connected between the square sum calculator 113 and the signal processing unit 14, that is, an analog to digital conversion is performed after a demodulation on the signal received by the reception unit 11; and in order to ensure the exactness of the detection of the signal received by the reception unit 11 by the signal processing unit 14, a corresponding process may be performed on the signal transmitted from the active capacitance stylus, for example, an amplifier may be connected between the mutual capacitor 10 and the reception unit 11 for amplifying the signal transmitted from the active capacitance stylus, or an amplifier may be connected between the first multiplier 122 (or the second multiplier 132) and the square sum calculator 113, etc.

Therefore, in the touch screen device of the present embodiment which mainly supports the active capacitance stylus, the signal input unit outputs two orthogonal demodulation signals, which pass through the first multiplier and the second multiplier respectively together with the signal received by the reception unit, then low pass portions of the two signals having passed the two multipliers are inputted into the square sum calculator via low pass filters, and the amplitude of the signal received by the reception unit is recovered by the square sum calculator, so the signal processing unit can determine the contact of the active capacitance stylus with the touch screen according to the magnitude of the amplitude of the signal outputted from the square sum calculator. In the present embodiment, the signal received by the reception unit is demodulated by two orthogonal signals, so the amplitude of the signal received by the reception unit can be recovered exactly without the need that the demodulation signal must be synchronous with the signal received by the reception unit (or the signal transmitted from the active capacitance stylus), so there is no need to add additional hardware resources for synchronization in the touch screen device of the embodiment of the present invention compared with the existing detection method which needs to perform synchronization of the demodulation signal and the signal transmitted from the active capacitance stylus in the prior art, and the detection efficiency of the active capacitance stylus is greatly improved since the synchronization is not needed.

Figure 3:
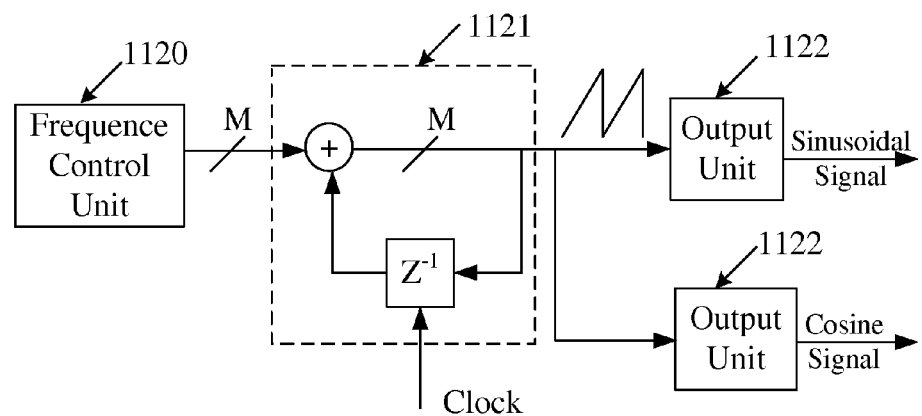
FIG. 3 is a schematic structure diagram of a signal input unit in a touch screen device according to an embodiment of the present invention.

Referring to FIG. 3, in a specific embodiment, the signal input unit 112 in the touch screen device may be implemented by a device such as a numerically controlled oscillator (NCO) or a frequency divider, wherein the adjustment precision is higher when a NCO is used. The main point is that the two orthogonal signals are generated under control of one input signal (the clock signal below), it can be implemented by but not limit to the following structure: a frequency control unit 1120, a phase accumulator 1121 and two output units 1122.

An output end of the frequency control unit 1120 is connected with an input end of the phase accumulator 1121 for controlling a frequency of a signal output by the phase accumulator 1121, specifically, providing a frequency control value to the phase accumulator 1121, the frequency control value is an invariable value, or may be a value varies over time; in the phase accumulator 1121, the output end is connected with another input end of the phase accumulator 1121 through a feedback circuit $Z^{-1}$, and the output end is also connected with two output units 1122 for generating a signal of certain frequency, the generated signal is controlled by a clock signal inputted by a clock signal input end and the frequency control unit 1120, specifically, the phase accumulator 1121 continually accumulates the frequency control value output by the frequency control unit 1120 under the drive of the clock signal inputted by the clock signal input end of the feedback circuit, and outputs an overflow signal, i.e., a triangular wave signal; wherein the feedback circuit $Z^{-1}$ mainly delays the accumulated signal for a period of a certain clock signal and then feeds the delayed signal to an the input end.

The two output units 1122 are used for converting the triangular wave signal into two orthogonal signals, such as a sinusoidal wave signal and a cosine wave signal, a square wave signal, or a trapezoidal wave signal.

Supposing the frequency of the clock signal inputted by the clock signal input end is fsys, the frequency control value provided by the frequency control unit 1120 is P, and the bit width of the phase accumulator 1121 is M, then the frequency of the triangular wave signal output from the phase accumulator 1121 is represented as: fo=(P/2^M)*fsys.

Therefore, the signal input unit 112 can be drove to operate when a clock signal of certain frequency and certain amplitude is inputted by the clock signal input end of the feedback circuit in the phase accumulator 1121, specifically, supposing the frequency control value output by the frequency control unit 1120 is P (P<2^M), the bit width of the phase accumulator 1121 is M bits, the phase accumulator 1121 has an initial value of 0 and continually accumulates for the frequency control value P under the drive of the clock signal, the accumulated value will be greater than M bits after a period of time, and an overflow will occur since the phase accumulator 1121 merely has a bit width of M bits. A triangular wave signal is generated by the above process, and the triangular wave signal may be used to explain a corresponding relationship between the value accumulated by the phase accumulator 1121 and the time; the triangular wave signal are converted into two orthogonal signals by two output units 1122 respectively, and are output to an input end of the first multiplier 122 and an input end of the second multiplier 132 respectively.

In the present embodiment, the signal input unit 112 can obtain two orthogonal signals by the frequency control unit 1120, the phase accumulator 1121 and the two output units 1122, and thereby the precision of frequency adjustment is high; in other embodiments, the signal input unit 112 may include only two output units 1122 for respectively inputting two orthogonal signals corresponding to a signal of certain frequency, such method has a simple structure but has a low frequency precision.

It should be explained that in the above embodiment of the touch screen device, the signal transmitted from the active capacitance stylus and the demodulation signal used in the touch screen device are two independent clock, generally, the two independent clocks both come from crystal and have little deviation, so the two clocks may be considered to have a same frequency but different phases. However, in some applications, the clocks may be not from crystal or the precision of the crystal is low, so a certain deviation may appear after a long time, so the finally obtained energy value will be changed over time after signals of different frequencies pass through the first multiplier 122, the second multiplier 132, the low pass filters 123 and the square sum calculator 113, etc, in the touch screen device shown in FIG. 2, and the exactness of detection for the active capacitance stylus is affected.

Figure 4:
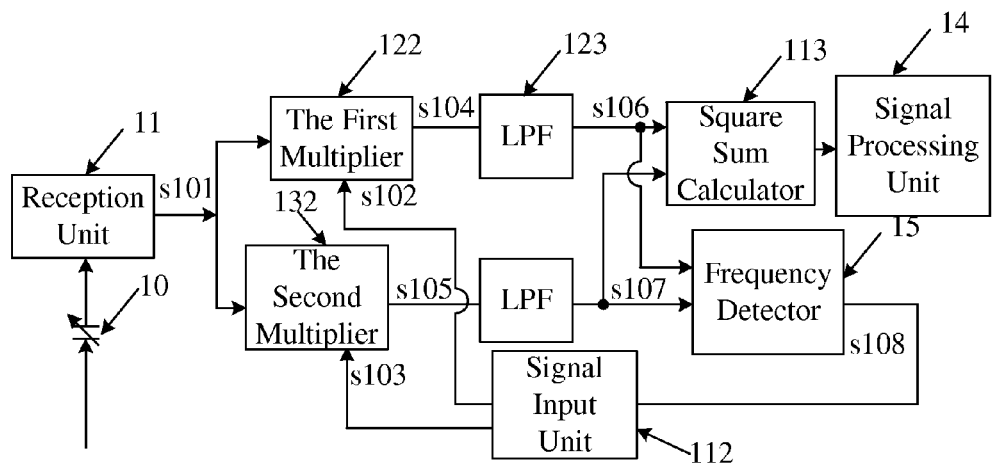
FIG. 4 is a schematic structure diagram of another touch screen device according to an embodiment of the present invention.

Referring to FIG. 4, in order to avoid such situation and keep the frequency of the signal transmitted from the active capacitance stylus consistent with the frequency of the demodulation signal used in the touch screen device, in another specific embodiment, besides the structure shown in FIG. 2, the touch screen device may also include a frequency detector 15, the output ends of the two low pass filters 123 in the touch screen device are also connected (directly or indirectly) with two input ends of the frequency detector 15, an output end of the frequency detector 15 is connected with the frequency control end of the signal input unit 112, the frequency detector 15 is used for outputting a frequency difference of the signal inputted by the signal input unit 112 and the signal received by the reception unit 11; the signal input unit 112 is used for adjusting the frequencies of the two output orthogonal signals according to the frequency difference received by the frequency control end, so as to make the two orthogonal signals and the signal received by the reception unit 11 have a same frequency.

Figure 5:
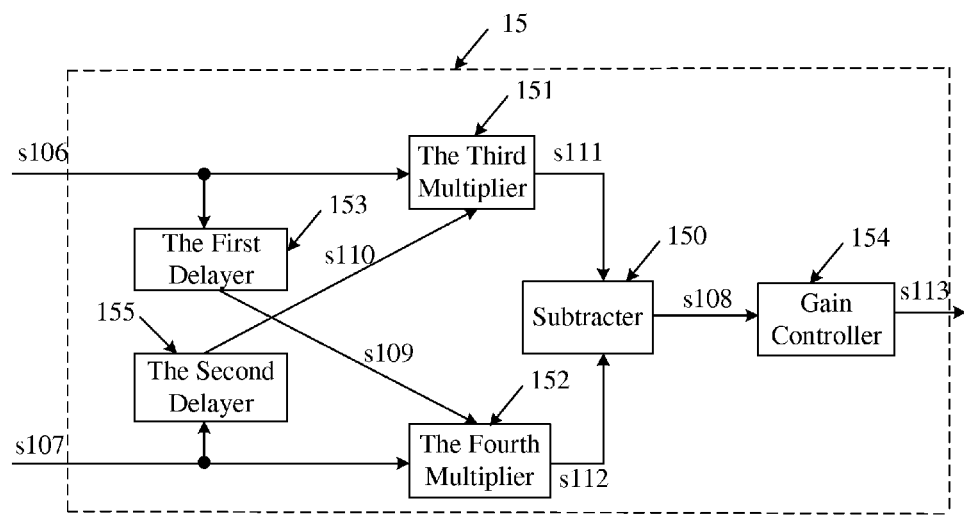
FIG. 5 is a schematic structure diagram of a frequency detector in a touch screen device according to an embodiment of the present invention.

In a specific implement, the frequency detector 15 may have but not limit to the structure shown in FIG. 5, which specifically includes: a subtracter 150, a third multiplier 151, a fourth multiplier 152, a first delayer 153, a second delayer 55 and a gain controller 154, wherein the output end of the low pass filter 123 connected with the first multiplier 122 and the output end of the low pass filter 123 connected with the second multiplier 132 in the touch screen device are connected (directly or indirectly) with the input ends of the first delayer 153 and the second delayer 155 respectively, output ends of the first delayer 153 and the second delayer 155 are connected with an input end of the fourth multiplier 152 and an input end of the third multiplier 151 respectively; the output end of the low pass filter 123 connected with the first multiplier 122 and the output end of the low pass filter 123 connected with the second multiplier 132 are connected (directly or indirectly) with another input end of the third multiplier 151 and another input end of the fourth multiplier 152 respectively, and output ends of the third multiplier 151 and the fourth multiplier 152 are connected with two input ends of the subtracter 150 respectively; an output end of the subtracter 150 is connected with an input end of the gain controller 154 for amplifying, diminishing or nonlinear scaling the signal output by the subtracter 150, the output end of the gain controller 154 is connected with the frequency control end of the signal input unit 112. Wherein the output end of each of the two delayers in the frequency detector 15 is connected with an input of the multiplier connected with the input end of the other delayer of the two delayers, so that a butterfly style multiplication can be performed.

If the signal input unit 112 is implemented by the structure shown in FIG. 3, the output of the gain controller 154 is connected (directly or indirectly) with the input end of the frequency control unit 1120 included in the signal input unit 112, so that the frequency control unit 1120 may adjust an output frequency control value according to the frequency difference of the signal received by the reception unit 11 and the demodulation signal, such as adding the frequency difference to the original frequency control value, and output the adjusted frequency control value to the phase accumulator 1121. In order to eliminate the interference, a filter may be connected between the gain controller 154 and the frequency control unit 1120, so that the frequency control of the orthogonal signals inputted by the signal input unit 112 is more exact.

In order to explain the procedure of the signal processing in the touch screen device of the present embodiment specifically, supposing the signal s101 received by the reception unit 11 is A sin ($w_1$t), the two orthogonal signals inputted into the first multiplier 122 and the second multiplier 132 by the signal input unit 112 are s102 and s103 respectively, i.e., B sin ($w_2$t+Φ) and B cos ($w_2$t+Φ), wherein $w_1$ and $w_2$ represent the frequency of the received signal and the frequency of the demodulation signal respectively, which are close but not the same. Φ represents a phase difference of the demodulation signal and the received signal. At time t1, the signal s104 output by the first multiplier 122 is:

$$A \sin(w_1 t_1) * B \sin(w_2 t_1 + \Phi) = (AB/2) * [\cos((w_1-w_2)t_1 - \Phi) - \cos((w_1+w_2)t_1 + \Phi)] \quad (1)$$

the signal s105 outputted from the second multiplier 132 is:

$$A\sin(w_1 t_1) * B\cos(w_2 t_1 + \Phi) = (AB/2) * [-\sin(w_1 - w_2)t_1 - \Phi) + \sin((w_1 + w_2)t_1 + \Phi)] \quad (2)$$

In parentheses of the above (1) and (2), the first term is a low frequency component of the signal, the second term is a high frequency component of the signal, and the signal s106, which is obtained by making the signal s104 output by the first multiplier 122 pass through the low pass filter (LPF) 123, is: $(AB/2)*\cos((w_1-w_2)t_1-\Phi) = P\cos(\Delta wt_1-\Phi)$, the signal s107, which is obtained by making the signal s105 output by the second multiplier 132 pass through the low pass filter 123, is: $(AB/2)*-\sin((w_1-w_2)t_1-\Phi) = -P\sin(\Delta wt_1-\Phi)$, wherein $P=(AB/2)$, $\Delta w=(w_1-w_2)$, finally the square sum calculator 113 adds the squares of the amplitudes of the signal s106 and the signal s107 together and outputs the sum to the signal processing unit 14.

In order to make the frequency of the signal received by the reception unit 11 consistent with the frequency of the demodulation signal, the signal s106 and the signal s107 also need to pass through the frequency detector 15, specifically, the signal s106 and the signal s107 pass through the first delayer 153 and the second delayer 155 of the frequency detector 15 respectively and then a signal s109 and a signal s110 are obtained, wherein the signal s110 is $P\cos(\Delta wt_2 \Phi)$, the signal s109 is $-P\sin(\Delta wt_2-\Phi)$, making t1-t2=Δt; a signal s108, i.e., a frequency difference, is obtained after a butterfly style multiplication of the third multiplier 151 and the fourth multiplier 152 and a subtraction operation of the subtracter 150:

$$\begin{aligned} s108 &= s106 * s110 - s107 * s109 \quad (3)\\ &= -P\cos(\Delta wt_1 - \Phi) * P\sin(\Delta wt_2 - \Phi) - \\ &\quad (-P\sin(\Delta wt_1 - \Phi) * P\cos(\Delta wt_2 - \Phi)) \\ &= P^2\sin(\Delta w(t_1 - t_2)) \\ &= P^2\sin(\Delta w * \Delta t) \end{aligned}$$

wherein if Δt is small, Δw*Δt is also a very small value, then the formula (3) may be approximately rewritten to be s108≈P2(Δw*Δt), if an appropriate gain, such as 1/(P2Δt), is given to the signal s108, a frequency difference s113 of the signal received by the reception unit 11 and the demodulation signal, i.e., Δw, can be obtained. Furthermore, if the signal output by the gain controller 154 is filtered, the frequency control of the signal input unit 112 is more exact after an interference is removed.

In the embodiments of the touch screen devices shown in FIG. 2 to FIG. 5, since the deviation between the frequency of the signal received by the reception unit 11 and the frequency of the demodulation signal is generally not very large, the transmission frequency of the active capacitance stylus may be continually tracked by the frequency detector 15 in FIG. 4 and FIG. 5 and the stability of the asynchronism detection is greatly improved.

Figure 6:
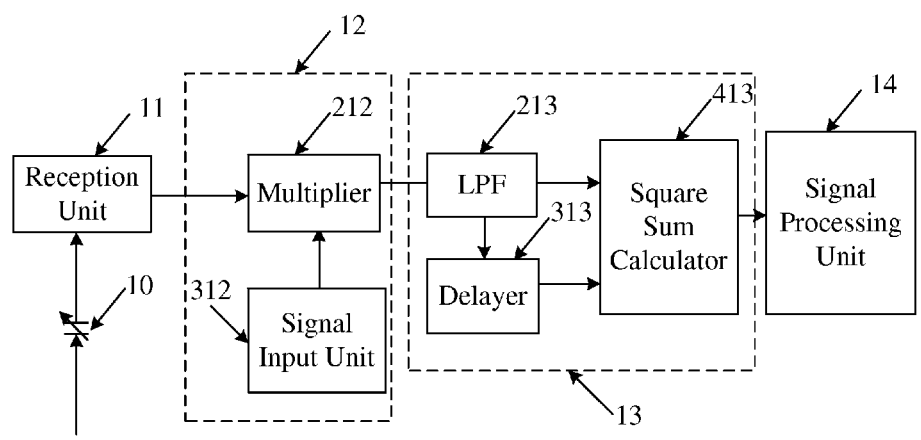
FIG. 6 is a schematic structure diagram of another touch screen device according to a second embodiment of the present invention.

A second embodiment provides a touch screen device which obtains two orthogonal signals mainly by a time sharing multiplexing manner, a schematic structure diagram thereof is shown in FIG. 6, and a connection between two blocks in FIG. 6 does not necessarily represent direct connection between the two blocks, the touch screen device includes a reception unit 11, a signal processing unit 14 and a mutual capacitor 10 connected with the reception unit 11, where the mutual capacitor 10 is an inherent structure of the touch screen in the touch screen device, a demodulation unit 12 in the touch screen device includes a multiplier 212 and a signal input unit 312, an amplitude recovery unit 13 includes a square sum calculator 413, a delayer 313 and a low pass filter 213.

An output end of the signal input unit 312 is connected with an output end of the multiplier 212, an output end of the reception unit 11 is connected with another input end of the multiplier 212, an output end of the multiplier 212 is connected with an input end of the low pass filter (LPF) 213, an output end of the low pass filter 213 is connected (directly or indirectly) with an input end of the square sum calculator 413 and an input end of the delayer 313.

Wherein the low pass filter 413 is used for outputting a low pass portions of the signal output by the multiplier 212, and the signal input unit 312 is used for outputting two orthogonal signals in a time sharing manner, the time sharing herein mainly refers to a time partitioning according to a signal period, then the phases of the two output signals will not be changed, for example, outputting according to a sinusoidal signal during a first half time (for example, the first N periods) and outputting according to a cosine signal during a second half time, or outputting according to a cosine signal during a first half time and outputting according to a sinusoidal signal during a second half time. Furthermore, the switching of the outputs of the two orthogonal signals may be a direct switching, a signal zero-crossing switching, or it may need to pass a window function attenuation transition area to prevent influence brought by signal overshoot.

An output end of the delayer 313 is connected with another input end of the square sum calculator 413, an output end of the square sum calculator 413 is connected with the signal processing unit 14, the delayer 313 is used for obtaining a signal output by the low pass filter 213 after a period of delaying, the period for delaying is a time interval between the input of one signal and the input of another orthogonal signal by the signal input unit 312, and thereby the signals inputted into the square sum calculator 413 include the low pass portions of the signal received by the reception unit 11 and then demodulated by the two orthogonal signals, i.e., the output signal of the delayer 313 and the output signal of the low pass filter 213.

In the present embodiment, the signal output by the reception unit 11 needs to be demodulated to recover the amplitude of the signal of the reception unit 11, and the signal processing unit 14 determines whether the active capacitance stylus contacts the touch screen and the touch position of the touch screen according to the amplitude of the signal. Wherein the demodulation is mainly to demodulate the received signal by two orthogonal demodulation signals, that is, the multiplier 212 multiplies the signal received by the reception unit 11 by a signal output by the signal input unit 312 and outputs the low pass portions to the square sum calculator 413, and the delayer 313 outputs the low pass portions of the product of the signal received by the reception unit 11 and another orthogonal signal output by the signal input unit 312 to the square sum calculator 413; and the square sum calculator 413 adds the squares of the amplitudes of the signals received by the two input ends together, then the amplitude of the signal received by the reception unit 11 can be recovered; the signal processing unit 14 determines whether the active capacitance stylus contacts the touch screen according to the magnitude of the amplitude of the signal recovered by the square sum calculator 413 and can determine the contact position on the touch screen by the active capacitance stylus. Wherein the two orthogonal signals inputted by the signal input unit 312 in a time sharing manner may be asynchronous with the signal transmitted from the active capacitance stylus mainly refers to phase asynchronism, but the orthogonal signals and the transmission signal need to have a same frequency.

It should be explained that the touch screen device of the present embodiment may be a device which only supports active capacitance stylus detection; or may be a device which supports both active capacitance stylus detection and finger detection, in such a case, the touch screen device may also include a transmission unit for transmitting signals, and the mutual capacitor is connected between the transmission unit and the reception unit, the touch screen device may detect the contact of the finger and the active capacitance stylus with the touch screen in a time sharing manner, wherein the transmission unit may include multiple transmission ends for transmitting signals, and the reception unit 11 may include multiple reception ends for receiving signals, they may operate at a same time or in a time sharing manner.

It can be understood that besides the structure shown in FIG. 6, the touch screen device may also include other components such as a unit for converting an analog signal received by the reception unit 11 into a digital signal, i.e., analog to digital converter (ADC), the analog to digital converter may be connected between the reception unit 11 and the multiplier 212, or between the square sum calculator 413 and the signal processing unit 14; and in order to ensure the exactness of the detection of the signal received by the reception unit 11 by the signal processing unit 14, a corresponding process may be performed to the signal transmitted from the active capacitance stylus, for example, an amplifier may be connected between the mutual capacitor 10 and the reception unit 11 for amplifying the signal transmitted by the active capacitance stylus, or an amplifier may be connected between the multiplier 212 and the square sum calculator 413, etc.

It can be seen that in the touch screen device of the present embodiment which mainly supports the active capacitance stylus, two orthogonal demodulation signals are output in a time sharing manner by the signal input unit, wherein low pass portions of a signal obtained by multiplying the signal received by the reception unit by one signal of the two orthogonal demodulation signals by the multiplier and low pass portions of a production obtained by multiplying the signal received by the reception unit by the other orthogonal signal of the two orthogonal demodulation signals obtained by the delayer are inputted into the square sum calculator, and then the amplitude of the signal received by the reception unit is recovered, thereby the signal processing unit can determine the contact of the active capacitance stylus with the touch screen according to the magnitude of the amplitude of the signal output by the square sum calculator. In the present embodiment, the signal received by the reception unit is demodulated by two orthogonal signals output in a time sharing manner, so that the amplitude of the signal received by the reception unit can be recovered exactly without the need that the demodulation signal must be synchronous with the signal received by the reception unit (or the signal transmitted by the active capacitance stylus), there is no need to add additional hardware resources for synchronization in the touch screen device of the embodiment of the present invention compared with the existing detection method which needs to perform synchronization of the demodulation signal and the signal transmitted by the active capacitance stylus in the prior art, and the detection efficiency of the active capacitance stylus is greatly improved since the synchronization is not needed. Furthermore, in the present embodiment, the orthogonal signals do not need to be output at a same time, and thereby the device performing demodulation process on the signal received by the reception unit such as a multiplier can be multiplexed, therefore the structure of the device is simplified.

Figure 7:
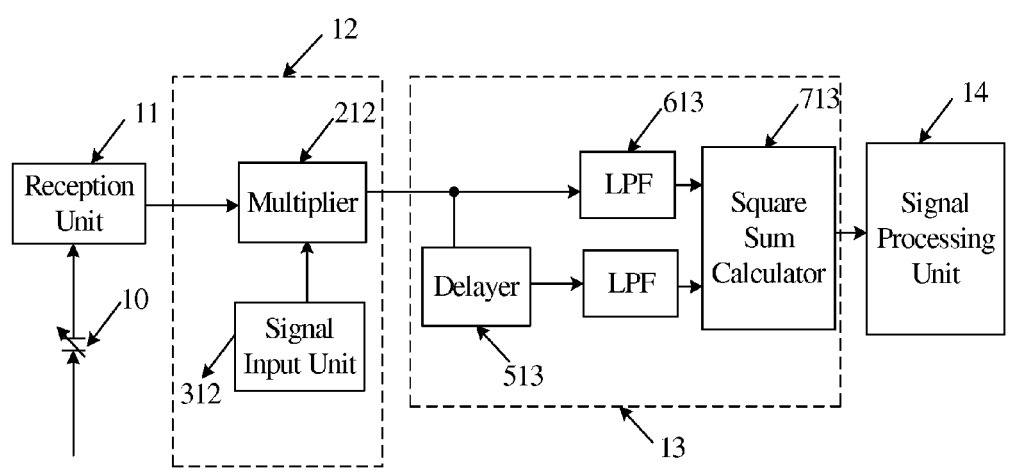
FIG. 7 is a schematic structure diagram of another touch screen device according to a third embodiment of the present invention.

A third embodiment provides another touch screen device which obtains two orthogonal signals mainly by a time-sharing multiplexing manner, a schematic structure diagram thereof is shown in FIG. 7, and connection between two blocks in FIG. 7 does not necessarily represent direct connection between the two blocks, the touch screen device includes a reception unit 11, a signal processing unit 14 and a mutual capacitor 10 connected with the reception unit 11, where the mutual capacitor 10 is an inherent structure of the touch screen in the touch screen device, a demodulation unit 12 in the touch screen device includes a multiplier 212 and a signal input unit 312, an amplitude recovery unit 13 includes a square sum calculator 713, a delayer 513 and two low pass filters 613.

An output end of the signal input unit 312 is connected with an input end of the multiplier 212, an output end of the reception unit 11 is connected with another input end of the multiplier 212, an output end of the multiplier 212 is connected with an input end of one low pass filter (LPF) 613 and an input end of the delayer 513, an output end of the delayer 513 is connected with an input end of another low pass filter 613, output ends of the two low pass filters are connected (directly or indirectly) with two input ends of the square sum calculator 713 respectively, and an output of the square sum calculator 713 is connected with the signal processing unit 14.

Wherein the signal input unit 312 is used for outputting two orthogonal signals in a time sharing manner, the time sharing herein mainly refers to a time partitioning according to a signal period, thereby the phases of the two outputted signals will not be changed, and the switching of the outputs of the two orthogonal signals may be a direct switching, a signal zero-crossing switching, or may need to pass a window function attenuation transition area to prevent influence brought by signal overshoot; the delayer 513 is used for obtaining a signal output by the multiplier 212 after a period of delaying, the period of delaying is a time interval between the input of one signal and the input of another orthogonal signal by the signal input unit 312; the low pass filters 613 are used for inputting the low pass portions of the signal output by the multiplier 212 and the low pass portions of the signal outputted from the delayer 513 into the square sum calculator 713. Thereby the signals inputted into the square sum calculator 713 include the low pass portions of signals obtained by demodulating a signal received by the reception unit 11 by two orthogonal signals.

In the present embodiment, the signal output by the reception unit 11 needs to be demodulated by two orthogonal signals inputted by the signal input unit 312, then the amplitude of the signal of the reception unit 11 is recovered by the square sum calculator 713, and finally the signal processing unit 14 determines whether the active capacitance stylus contacts the touch screen and the contact position on the touch screen according to the amplitude of the signal. Wherein the two orthogonal signals inputted by the signal input unit 312 in a time sharing manner may be asynchronous with the signal transmitted from the active capacitance stylus mainly refers to phase asynchronism, but the orthogonal signals and the transmission signal need to have a same frequency.

It should be explained that the touch screen device in the present embodiment may be a device which only supports active capacitance stylus detection; or may be a device which supports both active capacitance stylus detection and finger detection, in such case, the touch screen device further includes a transmission unit for transmitting signals, and the mutual capacitor is connected between the transmission unit and the reception unit, the touch screen device can detect the contact of the finger and the active capacitance stylus with the touch screen in a time sharing manner, wherein the transmission unit may include multiple transmission ends for transmitting signals, the reception unit 11 may include multiple reception ends for receiving signals, they may operate at a same time or in a time sharing manner.

It can be understood that besides the structure shown in FIG. 7, the touch screen device may further include other components such as a unit for converting an analog signal received by the reception unit 11 into a digital signal, i.e., an analog to digital converter (ADC), the analog to digital converter may be connected between the reception unit 11 and the multiplier 212, or between the square sum calculator 713 and the signal processing unit 14.

The touch screen device in the present embodiment is similar with the touch screen device shown in FIG. 6, the difference between them is: in the present embodiment, a delayed signal having passed the multiplier 212 is obtained by the delayer 513 firstly and then the low pass portions of the signal output by the delayer 513 is inputted into the square sum calculator 713, so two low pass filters 613 are needed; however, in the embodiment shown in FIG. 6, the low pass portions of the signal output by the multiplier is obtained firstly, and then the delayed signal is obtained by the delayer, in such case only one low pass filter is needed; the above two cases yield a same result, but the structure shown in FIG. 6 is relatively simple.

A detailed description of touch screen devices provided by the embodiments of the present invention is made above, specific examples are used herein to describe the principle and embodiments of the present invention, the above description of the embodiments are merely used to facilitate understanding of the methods and core ideas of the present invention; meanwhile, amendments to the specific embodiments and the applications may be made by skilled in the art according to the ideas of the present invention, therefore, the contents of the disclosure should not be interpreted as a limitation to the present invention.

The invention claimed is:

1. A touch screen device, comprising a reception unit, a signal processing unit and a mutual capacitor connected with the reception unit, the touch screen device further comprises a demodulation unit and an amplitude recovery unit;
   the demodulation unit is connected with an output end of the reception unit for demodulating a signal received by the reception unit by two orthogonal signals;
   an output end of the demodulation unit is connected with the amplitude recovery unit, the amplitude recovery unit is used for obtaining low pass portions of two demodulated signals demodulated by the demodulation unit, determining an amplitude of the signal received by the reception unit according to the amplitudes of the low pass portions of the two demodulated signals, and transmitting the determined amplitude of the signal to the signal processing unit.

2. The touch screen device according to claim 1, wherein the demodulation unit comprises a signal input unit and two multipliers, the amplitude recovery unit comprises a square sum calculator and two low pass filters, wherein
   the signal input unit comprises two signal output ends, the two signal output ends are connected with an input end of a first multiplier and an input end of a second multiplier of the two multipliers respectively for outputting the two orthogonal signals;
   the output end of the reception unit is connected with another input end of the first multiplier and another input end of the second multiplier, output ends of the first multiplier and the second multiplier are connected with input ends of the two low pass filters respectively;
   output ends of the two low pass filters are connected with two input ends of the square sum calculator respectively;
   an output end of the square sum calculator is connected with the signal processing unit.

3. The touch screen device according to claim 2, wherein the touch screen device further comprises a frequency detector;
   the output ends of the two low pass filters are also connected with two input ends of the frequency detector respectively, an output end of the frequency detector is connected with a frequency control end of the signal input unit;
   the frequency detector is used for outputting a frequency difference between a signal inputted by the signal input unit and the signal received by the reception unit;
   the signal input unit is used for adjusting a frequency of the two output orthogonal signals according to the frequency difference received by the frequency control end, so as to make the two orthogonal signals and the signal received by the reception unit have a same frequency.

4. The touch screen device according to claim 3, wherein the signal input unit comprises a frequency control unit, a phase accumulator and two output units;
   an output end of the frequency control unit is connected with an input end of the phase accumulator for controlling a frequency of a signal output by the phase accumulator;
   an output end of the phase accumulator is connected with another input end of the phase accumulator by a feedback circuit, the output end of the phase accumulator is connected with the two output units for accumulating a frequency control value output by the frequency control unit under a drive of a clock signal inputted by a clock signal input end of the feedback circuit and outputting a triangular wave signal;
   the two output units are used for converting the triangular wave signal into two orthogonal signals.

5. The touch screen device according to claim 4, wherein the frequency detector comprises a subtracter, a first delayer, a second delayer, a gain controller, a third multiplier and a fourth multiplier;
   the output ends of the two low pass filters are connected with input ends of the first delayer and the second delayer respectively, output ends of the first delayer and the second delayer are connected with an input end of the fourth multiplier and an input end of the third multiplier respectively;
   the output ends of the two low pass filters are connected with another input end of the third multiplier and another input end of the fourth multiplier respectively, output ends of the third multiplier and the fourth multiplier are connected with two input ends of the subtracter respectively;
   an output end of the subtracter is connected with an input end of the gain controller, an output end of the gain controller is connected with an input end of the frequency control unit included in the signal input unit.

6. The touch screen device according to claim 2, further comprising a transmission unit, and the mutual capacitor is connected between the transmission unit and the reception unit.

7. The touch screen device according to claim 3, further comprising a transmission unit, and the mutual capacitor is connected between the transmission unit and the reception unit.

8. The touch screen device according to claim 4, further comprising a transmission unit, and the mutual capacitor is connected between the transmission unit and the reception unit.

9. The touch screen device according to claim 5, further comprising a transmission unit, and the mutual capacitor is connected between the transmission unit and the reception unit.

10. The touch screen device according to claim 1, wherein the demodulation unit comprises a multiplier and a signal input unit, the amplitude recovery unit comprises a square sum calculator, a delayer and a low pass filter, wherein:
- an output end of the signal input unit is connected with an input end of the multiplier, the output end of the reception unit is connected with another input end of the multiplier, an output end of the multiplier is connected with an input end of the low pass filter; an output end of the low pass filter is connected with an input end of the square sum calculator and an input end of the delayer; the signal input unit is used for outputting two orthogonal signals in a time sharing manner;
- an output end of the delayer is connected with another input end of the square sum calculator, an output of the square sum calculator is connected with the signal processing unit.

11. The touch screen device according to claim 10, further comprising a transmission unit, and the mutual capacitor is connected between the transmission unit and the reception unit.

12. The touch screen device according to claim 1, wherein the demodulation unit comprises a multiplier and a signal input unit, the amplitude recovery unit comprises a square sum calculator, a delayer and two low pass filters, wherein:
- an output end of the signal input unit is connected with an input end of the multiplier, the output end of the reception unit is connected with another input end of the multiplier; the signal input unit is used for outputting two orthogonal signals in a time sharing manner;
- an output end of the multiplier is connected with an input end of one low pass filter and an input end of the delayer, an output end of the delayer is connected with an input end of another low pass filter, output ends of the two low pass filters are connected with two input ends of the square sum calculator respectively, an output of the square sum calculator is connected with the signal processing unit.

13. The touch screen device according to claim 12, further comprises a transmission unit, and the mutual capacitor is connected between the transmission unit and the reception unit.

\* \* \* \* \*